(12) United States Patent
Kim

(10) Patent No.: US 6,848,317 B2
(45) Date of Patent: Feb. 1, 2005

(54) METHOD AND APPARATUS FOR UNIFORMIZING OUTPUT SIGNAL LEVELS OF MICRO-ELECTRO MECHANICAL SYSTEMS (MEMS) CAPACITIVE SENSORS

(75) Inventor: Kyoung Soo Kim, Kyungki-do (KR)

(73) Assignee: Samsung Electro-Mechanics Co., Ltd. (KR)

(*) Notice: Subject to any disclaimer, the term of this patent is extended or adjusted under 35 U.S.C. 154(b) by 21 days.

(21) Appl. No.: 10/420,864

(22) Filed: Apr. 23, 2003

(65) Prior Publication Data

US 2004/0107775 A1 Jun. 10, 2004

(30) Foreign Application Priority Data

Dec. 10, 2002 (KR) .................... 10-2002-0078224

(51) Int. Cl.[7] .............................................. G01L 7/00
(52) U.S. Cl. .................... 73/714; 73/514.18; 324/259
(58) Field of Search ............... 73/700, 714, 514.8; 324/259

(56) References Cited

U.S. PATENT DOCUMENTS

| | | | |
|---|---|---|---|
| 5,445,006 A | | 8/1995 | Allen et al. |
| 6,071,819 A | * | 6/2000 | Tai et al. .................... 438/694 |
| 6,705,165 B2 | * | 3/2004 | Garverick et al. ........ 73/514.18 |
| 2003/0140698 A1 | * | 7/2003 | Garverick et al. ........ 73/514.18 |

* cited by examiner

Primary Examiner—Edward Lefkowitz
Assistant Examiner—Andre Allen
(74) Attorney, Agent, or Firm—Lowe Hauptman Gilman & Berner, LLP

(57) ABSTRACT

The present invention is an apparatus and method for making output signal (AC voltage) levels of MEMS capacitive sensors uniform, each including a microstructure being displaced by a certain force and a fixed electrode for detecting capacitance variation caused by gap size difference between the microstructure and the fixed electrode, the apparatus and method comprising so as to apply actuating current of a predetermined frequency to the microstructure, output a sensing signal of the fixed electrode while receiving a reference offset voltage, compare an RMS level of the sensing signal with a preset RMS level, and then adjust the reference offset voltage of the fixed electrode so that the sensing signal made equal to a target level.

4 Claims, 6 Drawing Sheets

$Wsp\_A < Wsp\_B$
modulus of rigidity : $K_A < K_B$

METHOD AND APPARATUS FOR UNIFORMIZING OUTPUT SIGNAL LEVELS OF MICRO-ELECTRO MECHANICAL SYSTEMS (MEMS) CAPACITIVE SENSORS

BACKGROUND OF THE INVENTION

1. Field of the Invention

The present invention relates to a micro-electro mechanical systems (MEMS) capacitive sensor, and more particularly to an apparatus and a method for uniformizing output signal levels of MEMS capacitive sensors by compensating output signal level deviations caused by fabrication process variations without adjusting a process condition.

2. Description of the Related Art

MEMS stands for Micro-Electro Mechanical Systems and is defined as a technology combining very small-sized mechanical components such as sensors, valves, gears, mirrors and actuators implemented in a semiconductor chip and a computer.

Such MEMS has a wide range of applications such as navigation systems, air flow detecting sensors embedded in a flight wing for sensing air flow change in response to a surface resistance of a flight wing, an optical switching devices for aiding exchange of optical signals at 20 ns between separate optical signal paths, sensor actuating type air-conditioning systems, and sensors embedded in the base of building for changing characteristic of material by sensing air pressure. A magnetic sensor and a vibration accelerometer typically contained in an air bag of an automotive vehicle are the most representative applications of such MEMS.

Typically, an MEMS device is implemented by incorporating mechanical components such as mirrors and sensors, and microcircuits on a small silicon chip.

FIGS. 1A and 1B illustrate a conventional MEMS capacitive sensor. Referring to FIGS. 1A and 1B, the MEMS capacitive sensor 10 includes a glass substrate 11, silicon layers 12, 14 formed on the glass substrate 11, a microstructure 16 formed by etching silicon layers 12, 14 and a fixed electrode 17 spaced from the microstructure 16 by a certain gap. The MEMS capacitive sensor 10 operates to detect capacitance variation generated by displacement of the microstructure 16. The displacement is caused by a force of acceleration or the Lorentz force based on terrestrial magnetism. That is, as the displacement occurs, a size of the gap between the fixed electrode 17 and the microstructure 16 changes. The gap size variations cause a variation of capacitance between the microstructure and the fixed electrode. The MEMS capacitive sensor detects such capacitance variation.

Accordingly, in the MEMS capacitive sensors described above, an initial distance between the microstructure 16 and the fixed electrode 17 to must be constant so as to enable the MEMS capacitive sensors to output the same result under the same condition.

For example, with reference to FIG. 2A, in the case that springs 21, 22 supporting respective microstructures in different MEMS capacitive sensors have different widths Wsp_A and Wsp_B, respectively, that is, the width Wsp_A is smaller than the width Wsp_B, the modulus of rigidity of the spring 22 having relatively greater width Wsp_B is greater than that of the spring 21 having relatively smaller width Wsp_A. Since as the modulus of rigidity becomes greater, restoring force of the spring becomes smaller, the spring 22 having the relatively greater width Wsp-B has lesser restoring force than the spring 21.

Accordingly, with reference to FIG. 2B, assuming that an initial distance between a microstructure 24 supported by the spring 21 and a fixed electrode 23 is d0, with reference to FIG. 2C, an initial distance between a microstructure 26 supported by the spring 22 and a fixed electrode 25 deviates from the initial distance d0 to the extent of ±Δd because the restoring force of the spring 21 is less than that of the spring 22.

Such gap deviation causes a change in initial capacitance, thereby changing an output AC level of the MEMS capacitive sensor.

The gap deviation is caused by process variations existing whenever different semiconductor chips or wafers are processed.

Further, there are other causes of initial gap deviation: 1) gap status of a fixed electrode: etching depth or a degree of tilt, 2) wafer bonding status: interface grain or wafer inclination caused by wafer handling, and 3) bending caused by a stress and droop of a microstructure.

No matter how rigorously the fabrication process is controlled, such process variations may occur, and it is very difficult to find and remove the causes of such process variations.

Accordingly, an additional device or apparatus to compensate the output signal level deviations due to the process variations is required so as to make output signal levels of the MEMS sensors uniform.

FIG. 3 illustrates a conventional apparatus for making output levels of MEMS sensors uniform. A conventional apparatus for making output levels of MEMS sensors uniform is used for ensuring reproducible displacement of MEMS sensors under the same condition.

As shown in FIG. 3, a conventional output level uniform apparatus in the MEMS sensor includes sensing electrodes F1, F3 fixedly arranged at both end portions in one side of a microstructure F0 for sensing capacitance changes and control electrodes F2, F4 arranged at both end portions of the other side of the microstructure F0 for controlling displacement of the microstructure F0. The control electrodes F2, F4 are applied with equilibrium DC voltages to generate electrostatic force so that the microstructure F0 is allowed to positioned at the center of the sensing electrodes F1, F3.

However, the conventional output level uniform apparatus is disadvantageous in that a structure of the apparatus is complicated because it forcibly adjusts the location of the microstructure F0 by applying an additional electrostatic force to the microstructure F0. The conventional output level uniform apparatus further has a drawback that output levels may still vary due to the interference between the output signal and the electrostatic force caused by the control electrodes F2, F4.

Further, since the microstructure F0 is configured to be placed in the center of the sensing electrodes F1, F3, in the case that an initial gap size error of a gap between the sensing electrodes F1, F3 and the microstructure F0 exists, it is impossible compensate such initial gap deviation, so that output levels of all the microstructure may be different from each other.

SUMMARY OF THE INVENTION

Therefore, the present invention has been made in view of the above problem, and it is an object of the present invention to provide an apparatus and a method for making output signal AC levels of MEMS capacitive sensors uniform by compensating output signal level deviations caused by fabrication process variations without adjusting a process condition.

In accordance with one aspect of the present invention, the above and other objects can be accomplished by the provision of a method for making output signal levels of MEMS capacitive sensors uniform, each MEMS capacitive sensor including a microstructure being displaced by a certain force and a fixed electrode detecting capacitance variation caused by a gap size variation between the microstructure and the fixed electrode, the method comprising the steps of a) setting an initial reference value used for adjusting an output AC level of the MEMS capacitive sensor, and setting a target RMS level of the output AC level of the MEMS capacitive sensor, b) applying an actuating current of a predetermined frequency to the microstructure and detecting a voltage from the fixed electrode, c) detecting an RMS level of the voltage detected from the fixed electrode, d) comparing the RMS level detected in the step c) with the target RMS level, e) in the case that a result of the step d) indicates that there is an error between the detected RMS level and the target RMS level, adjusting the reference value by adding the proportional integral value of the error to the reference value or subtracting the proportional integral value of the error from the reference value, thereby outputting the adjusted current reference value as an offset voltage of the fixed electrode, and repeating the steps b) to e), and f) in the case that the detected RMS level is the same as the target RMS level in the step d), setting the offset voltage of the fixed electrode to the adjusted current reference value which is acquired at the time when no error is detected in the step e).

The method preferably further comprises a step of g) outputting an AC voltage as a sensing signal while the offset voltage set in the step f) is applied to the fixed electrode.

In accordance with another aspect of the present invention, the above and other objects can be accomplished by the provision of an apparatus for making output signal levels of MEMS capacitive sensors, each including a microstructure being displaced by a certain force and a fixed electrode for detecting capacitance variation caused by gap size variation between the microstructure and the fixed electrode uniform, comprising an oscillating section for applying actuating current of a predetermined frequency to the microstructure, a sensing signal outputting section for outputting a sensing signal of the fixed electrode while receiving a reference offset voltage, a converter section for converting the sensing signal of the sensing signal outputting section to a DC voltage corresponding to an RMS level of the sensing signal of the sensing signal outputting section, an error detecting section for detecting an error by comparing an RMS level of the DC voltage output from the converter section and a preset RMS level, and a proportional integral (PI) controlling section for adjusting the reference offset voltage of the fixed electrode to be in proportional to the error detected by the error detecting section, setting an offset voltage of the fixed electrode to the adjusted reference offset voltage when no error is detected in the error detecting section, and maintaining the offset voltage as set.

The apparatus preferably further comprises a phase matching section for matching a phase of an error signal output from the error detecting section.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
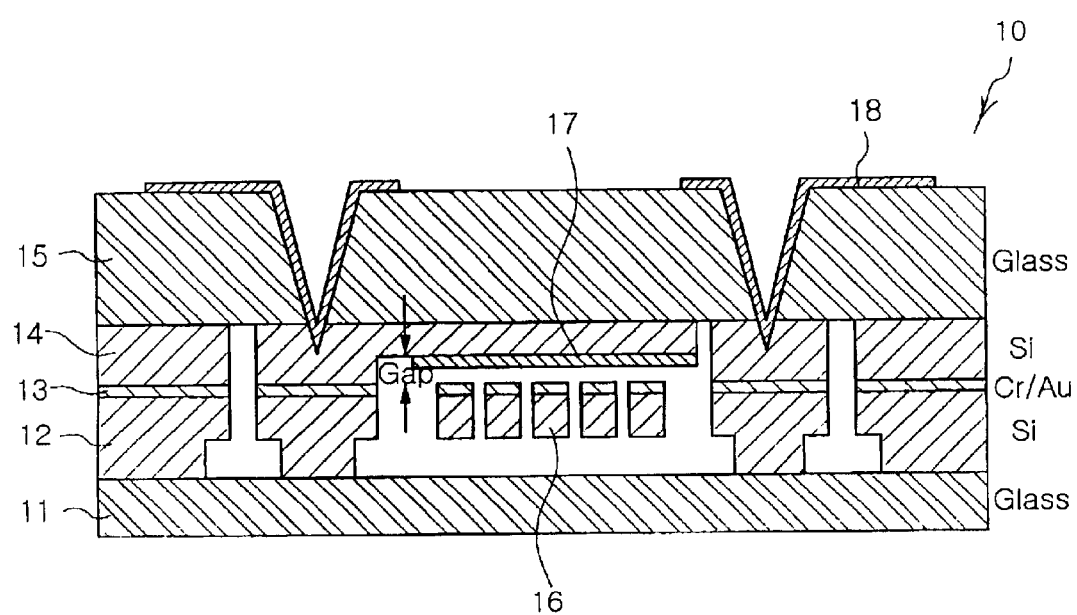
FIG. 1A is a sectional view of a conventional MEMS capacitive sensor.
Figure 1B:
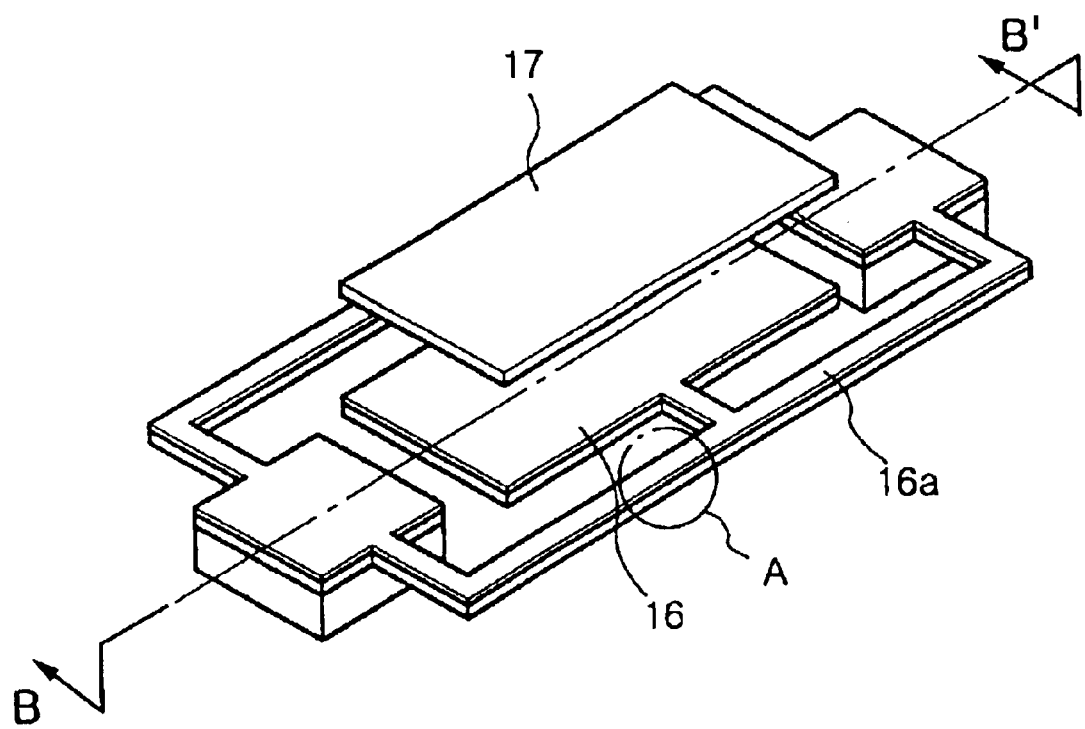
FIG. 1B is a perspective view of a mechanical component of a conventional MEMS capacitive sensor.
Figure 2A:
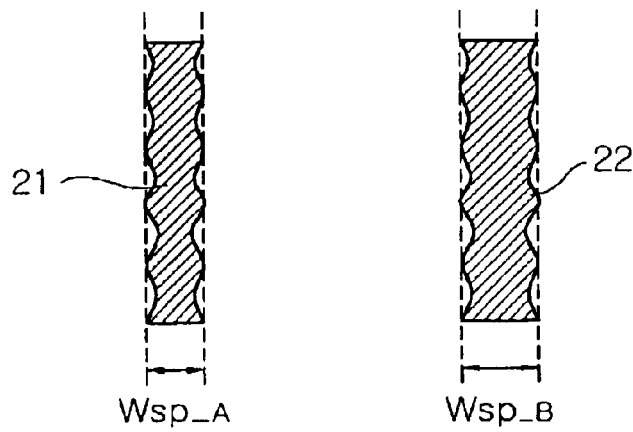
FIG. 2A is a front view of a part A in FIG. 1B, the front view being illustrated to explain etching rate differences among springs, the difference being caused by process variations.
Figure 2B:
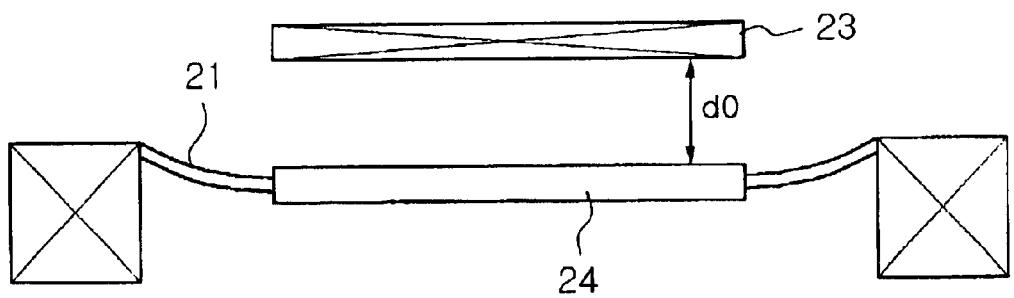
FIGS. 2B and 2C are schematic sectional views showing gap difference based on width difference of springs, wherein the sectional views are taken along a section line B–B'.
Figure 2C:
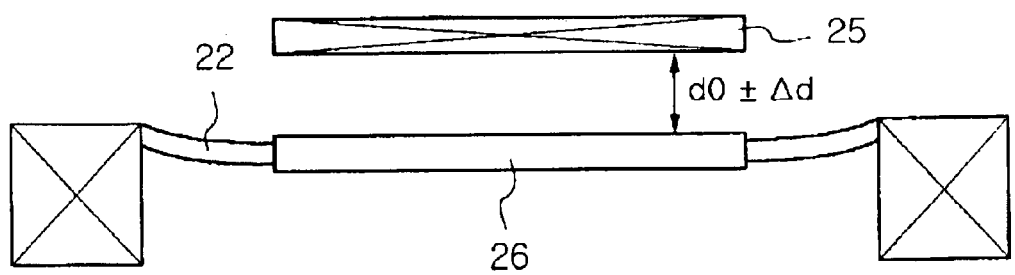
Figure 3:
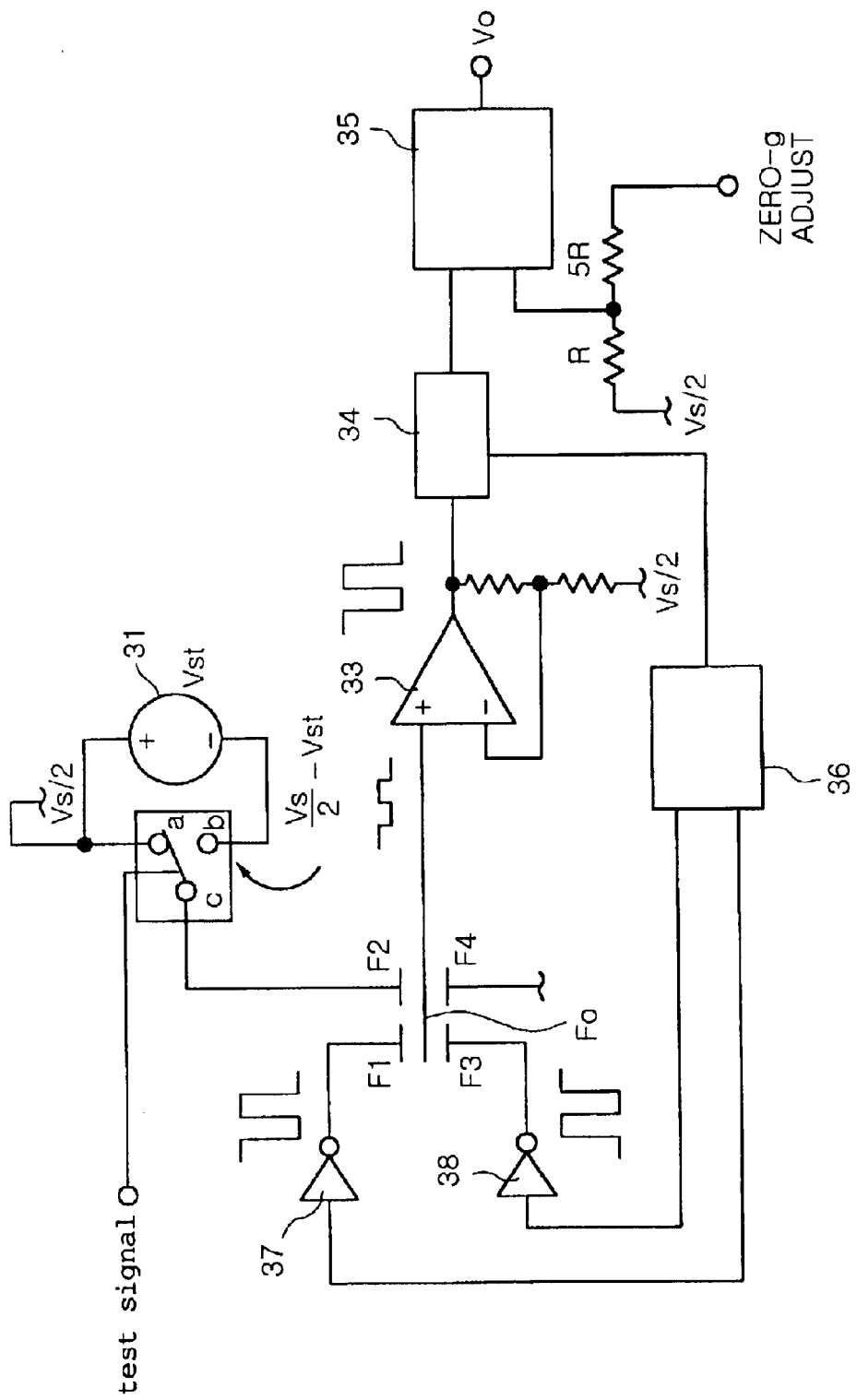
FIG. 3 is a conventional apparatus for making output signal levels uniform adapted in a conventional MEMS capacitive sensor.
Figure 4:
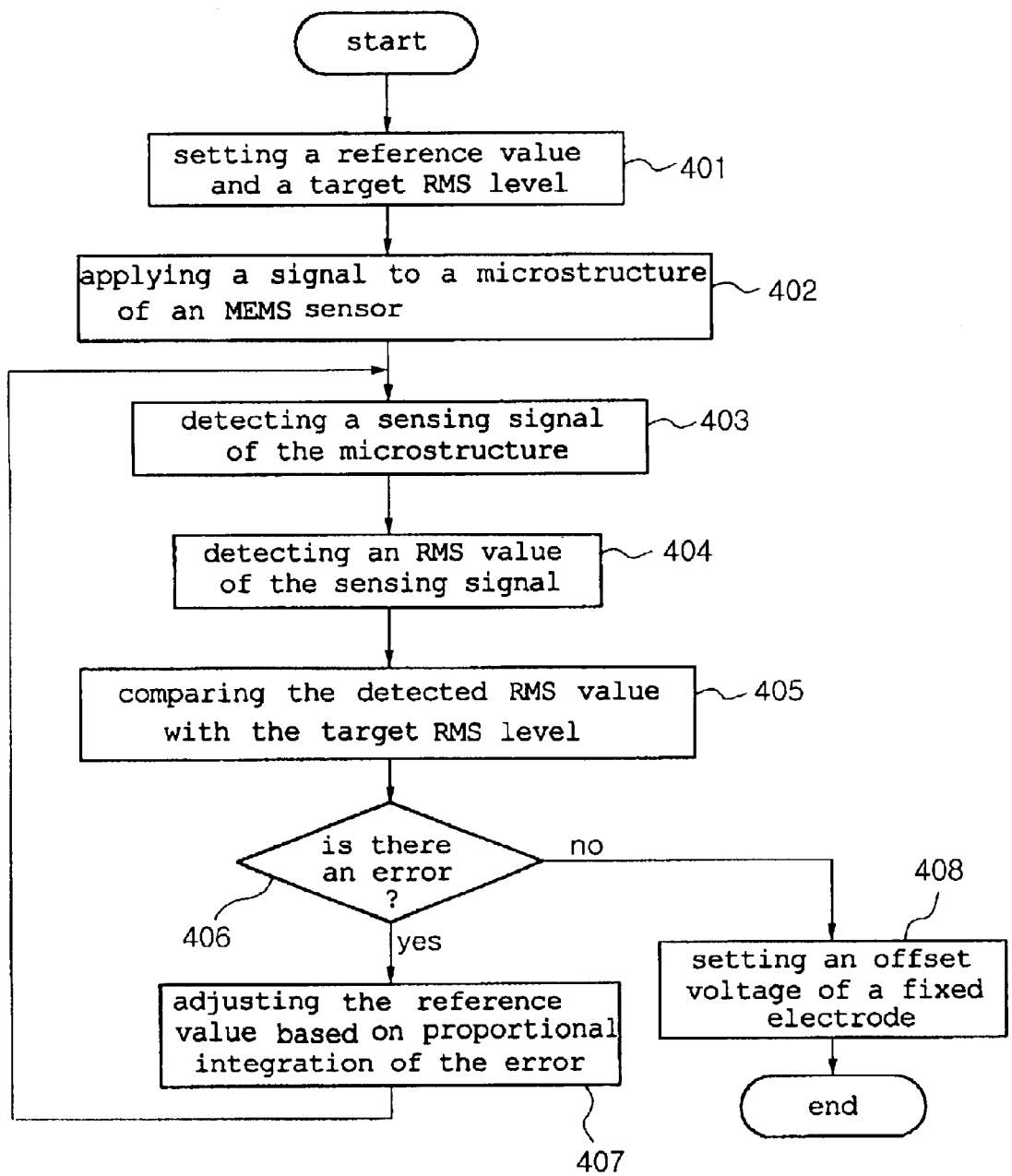
FIG. 4 is a flow chart showing a sequence for making output signal levels of MEMS capacitive sensors uniform in accordance with the present invention.

FIG. 4 illustrates a flow chart showing a sequence for making output levels of MEMS capacitive sensors uniform in accordance with the present invention. Referring to FIG. 4, a method for making output levels of MEMS devices uniform according to the present invention will be described below.

First, in step 401, a reference value of an offset voltage of a fixed electrode 17 and a target RSM level that is a desired output signal level of the MEMS sensor are set to respective initial values. The reference value is used as a reference for setting a level of a sensing signal output from a fixed electrode 17 of a microstructure 16. For example, the initial value of the reference value may be zero "0".

Next, actuating current of a predetermined frequency is applied to the microstructure 16 in step 402, and a sensing signal is detected from the fixed electrode 17 of the microstructure 16 in step 403. At this time, the detected sensing signal may be an AC voltage having a frequency corresponding to the predetermined frequency applied to the microstructure 16.

Next, in step 404, a root mean square (RMS) value of the AC voltage of the sensing signal detected from the fixed electrode 17 is detected.

Next, in step 405, the detected RMS value from the step 404 is compared with the target RMS level. This step is performed to confirm whether any deviation due to process variations exists in the microstructure.

Next, in step 406, it is determined whether there is an RMS level error between the detected RMS value and the target RMS level using a result from the step S405. In the case that the detected RMS level is not the same as the target RMS level, it means that a deviation due to the process variations exists in the microstructure. Therefore, output level deviation would be prevented and should be compensated.

Accordingly, in the case that the RMS level error is detected in the step 406, the reference value is adjusted by a proportional integral value of the RMS level error in step 407.

After adjusting the reference value, the steps 403 to 406 are repeated until the detected RMS value is the same as the target RMS level and the RMS level error becomes zero "0".

If the RMS level of the sensing signal of the microstructure finally becomes the same as the target RMS level by adjusting the reference value, no RMS level error is detected in the step 406.

Next, in step 408, in the case of detecting no error in the step 406, the offset voltage of the fixed electrode 17 is set to a current reference value achieved at the time when no RMS level error is detected and it is continuously maintained by feedback control.

Therefore, after the offset voltage is set to the current reference value, the MEMS capacitive sensor may output a sensing signal compensated by the offset voltage set to the current reference value.

Accordingly, the MEMS capacitive sensors fabricated in different fabrication processes may output the same result under the same sensing condition.

Figure 5:
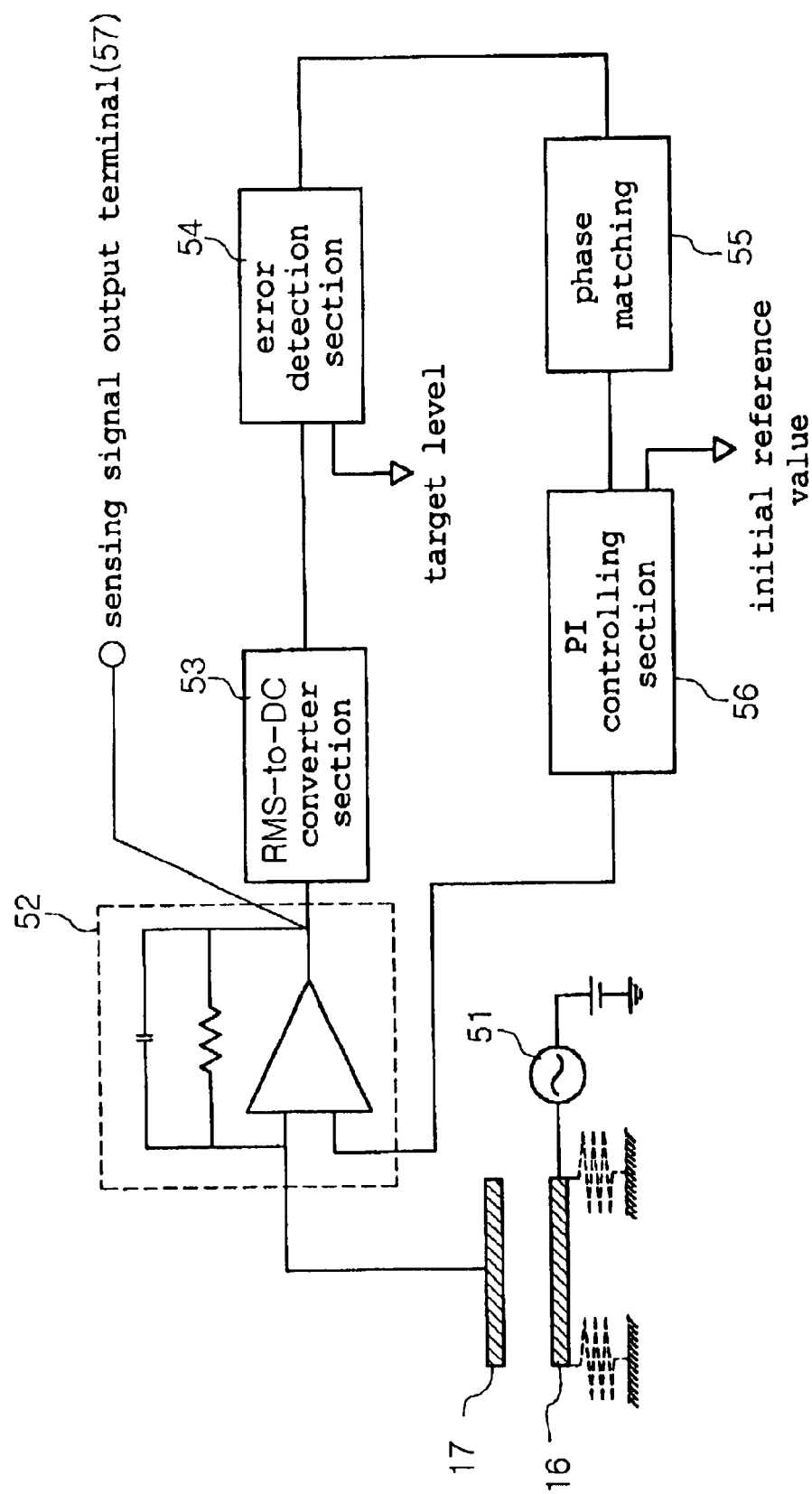
FIG. 5 is an output level uniform apparatus for making an output level of an MEMS capacitive sensor uniform in accordance with the present invention.

FIG. 5 illustrates an apparatus for making output signal levels of MEMS capacitive sensors uniform in accordance with the present invention. Referring to FIG. 5, an apparatus for making output signal levels of MEMS capacitive sensors uniform is employed in the MEMS capacitive sensor including a microstructure 16 being displaced by a certain force and a fixed electrode 17 for detecting capacitance variations caused by gap size variations between the fixed electrode and the microstructure 16. The apparatus for making output signal levels of MEMS capacitive sensors uniform according to the present invention includes an amplifying section 52 for detecting a sensing signal of the microstructure 16. The amplifying section 52 has a positive input terminal to which an offset voltage of the fixed electrode is applied. The amplifying section 52 detects a sensing signal of the microstructure 16 while the offset voltage of the fixed electrode is applied to the positive input terminal thereof. The apparatus for making output signal levels of MEMS capacitive sensors uniform in accordance with the present invention further includes an RMS-DC converter 53 for converting an RMS voltage of an AC signal (the sensing signal) output from the amplifying section 52 to a DC signal, an error detecting section 54 for detecting an error by comparing an RMS level of the DC signal output from the RMS-DC converter 53 and a target RMS level of an AC signal, a phase matching section 55 for adjusting a phase of an error signal output from the error detecting section 54, an proportional integration (PI) controlling section 56 for performing proportional integral of the error signal output from the phase matching section 55 and adjusting a reference value of the offset voltage of the fixed electrode 17 by adding integral values resulted from the proportional integral of the errors to the reference value or subtracting the integral value from the reference value, thereby outputting the adjusted reference value (current reference value) as the offset voltage of the fixed electrode 17, and an output terminal 57 for outputting an output signal of the amplifying section 52 as the sensing signal of the MEMS sensor.

In FIG. 5, unexplained reference symbol 51 denotes an oscillating section that applies actuating current of a predetermined frequency to the microstructure 16 of the MEMS sensor.

An operation of the apparatus for making output signal levels of MEMS capacitive sensors uniform in accordance with the present invention will be described below with reference to FIGS. 4 and 5.

First, an initial RMS level of the error detection section 54 is set to a target AC RMS level that is a desired sensing signal level expected to be output from the MEMS sensor. Then, an initial reference value of an offset voltage of the fixed electrode 17, which will be applied to the positive input terminal of the amplifying section 52 by the PI controlling section 56, is set to a certain voltage, for example, a half power supply voltage of a power system. Given that a power supply voltage is 3V, the initial reference value may be set to 1.5V.

Next, an actuating current of a predetermined frequency, preferably a resonant frequency of the microstructure, is applied to the microstructure 16 via the oscillating section 51.

Next, a voltage of the fixed electrode 17 of the MEMS sensor 10 is applied to a negative input terminal of the amplifying section 52.

On the other hand, the offset voltage of the fixed electrode 17, which is adjusted by the PI controlling section 56, is applied to the positive input terminal of the amplifying section 52.

In brief, while the offset voltage output from the PI controlling section 56 is applied to the fixed electrode 17, the amplifying section 52 outputs an AC signal across the fixed electrode 17 of the MEMS sensor 10. At this time, the output signal of the amplifying section 52 may be an AC signal level-controlled by the PI controlling section 56.

The output signal of the amplifying section 52 is input to the RMS-DC converter 53. The RMS-DC converter 53 outputs a DC voltage by converting the RMS value of the input AC signal to the DC voltage.

The DC voltage output from the RMS-DC converter 53 is input to the error detecting section 54. Then, the input DC voltage is compared with the target RMS level.

The error detecting section 54 detects an RMS level error that is a difference between the DC voltage output from the RMS-DC converter 53 and the target RMS level.

The RMS level error detected by the error detecting section 54 is phase shifted in the phase matching section 55 and then the phase shifted error signal is input to the PI controlling section 56. At this time, if the RMS level error has a value of zero "0", the integral value of the RMS level error becomes zero "0" too. Accordingly, the initial reference value is output from the PI controlling section 56, so that the initial reference value of offset voltage is applied to the amplifying section 52. On the other hand, if the RMS level error has a value other than zero "0", the integral value of the RMS level error is added to or subtracted from the initial reference value in the PI controlling section 56, so that the adjusted reference value is output from the PI controlling section and applied to the amplifying section 52.

Accordingly, if the RMS level of the sensing signal (AC signal) detected by the MEMS capacitive sensor 10 is consistent with a desired level, or the target RMS level, the output value of the error detecting section 54 is zero "0", so that the initially set reference value is not changed but maintained.

To the contrary, if the RMS level of the sensing signal (AC signal) is different from the desired level due to a process variation, the error detecting section 54 outputs an error having a value other than zero "0", so that the error is proportionally integrated and the reference values is adjusted by the proportional integral value of the error, and then the adjusted reference value is input to the amplifying section 52.

As a result, after the offset voltage of the fixed electrode is proportionally and integrally adjusted, the amplifying section 52 again outputs a new sensing signal (AC voltage) detected by the MEMS sensor 10. In the same way as described above, the AC voltage of the newly detected sensing signal is converted to a DC voltage by the RMS-DC converter 53, and then the converted DC voltage is compared with the target RMS level.

At this time, if the previous process is successively performed and no error is detected in the error detection section 54, the output value of the PI controlling section 56 may be set as a current reference value and the current reference value maintained.

As a result, the AC voltage of the output signal of the amplifying section 52 is stabilized and, therefore the MEMS sensor 10 can output the stabilized sensing signal through the output terminal 57.

In accordance with the present invention as described above, the output level deviations caused by fabrication process variations may be compensated without adjusting the process conditions or modifying the microstructure of the MEMS sensors. Further, a sensing operation of the MEMS sensor may be stabilized and the subsequent signal processing becomes easier. As a result, under the same sensing condition, the same sensing result may be obtained by the MEMS sensors fabricated in different fabrication processes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for uniformizing output signal levels of MEMS capacitive sensors uniform, each including a microstructure being displaced by a certain force and a fixed electrode for detecting capacitance variations caused by gap size variations between the microstructure and the fixed electrode, comprising the steps of:

a) initializing a reference value used for adjusting an output AC level of the MEMS capacitive sensor, and setting a target RMS level of the output AC level of the MEMS capacitive sensor;

b) applying an actuating current of a predetermined frequency to the microstructure and detecting a voltage from the fixed electrode;

c) detecting an RMS level of the voltage detected from the fixed electrode;

d) comparing the RMS level detected in the step c) with the target RMS level;

e) in the case that a result of the step d) indicates that there is an error between the detected RMS level and the target RMS level, adjusting the reference value by adding proportional integral value of the error to the reference value or subtracting the proportional integral value of the error from the reference value, thereby outputting the adjusted current reference value as an offset voltage of the fixed electrode, and repeating the steps b) to e); and f) in the case that the detected RMS level is the same as the target RMS level in the step d), setting the offset voltage of the fixed electrode to the adjusted current reference value which is obtained at the time when no error is detected in the step e).

2. The method as set forth in claim 1, further comprising the step of:

g) outputting an AC voltage as a sensing signal while the offset voltage set in the step f) is applied to the fixed electrode.

3. An apparatus for making output signal levels of MEMS capacitive sensors uniform, each including a microstructure being displaced by a certain force and a fixed electrode for detecting capacitance variation caused by gap size variation between the microstructure and the fixed electrode, comprising:

an oscillating section for applying an actuating current of a predetermined frequency to the microstructure;

a sensing signal outputting section for outputting a sensing signal of the fixed electrode while receiving a reference offset voltage;

a converter section for converting the sensing signal of the sensing signal outputting section to a DC voltage corresponding to an RMS level of the sensing signal of the sensing signal outputting section;

an error detecting section for detecting an error by comparing an RMS level of the DC voltage output from the converter section and a preset RMS level; and a PI controlling section for adjusting the reference offset voltage of the fixed electrode to be proportional to the error detected by the error detecting section, setting an offset voltage of the fixed electrode to the adjusted reference offset voltage when no error is detected in the error detecting section, and maintaining the offset voltage as set.

4. The apparatus as set forth in claim 3, further comprising:

a phase matching section for matching a phase of an error signal output from the error detecting section.

* * * * *